(12) United States Patent
Young et al.

(10) Patent No.: US 11,314,718 B2
(45) Date of Patent: Apr. 26, 2022

(54) SHARED DISK BUFFER POOL UPDATE AND MODIFICATION

(71) Applicant: INTERNATIONAL BUSINESS MACHINES CORPORATION, Armonk, NY (US)

(72) Inventors: Wayne Jonleon Young, Toronto (CA); Pavel Sustr, Campbellville (CA); Zachary T. Hoggard, Markham (CA)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 16/690,294

(22) Filed: Nov. 21, 2019

(65) Prior Publication Data

US 2021/0157784 A1   May 27, 2021

(51) Int. Cl.
*G06F 16/23* (2019.01)
*G06F 16/28* (2019.01)
*G06F 16/2455* (2019.01)

(52) U.S. Cl.
CPC ...... *G06F 16/2336* (2019.01); *G06F 16/2379* (2019.01); *G06F 16/24552* (2019.01); *G06F 16/28* (2019.01)

(58) Field of Classification Search
CPC .. G06F 16/2336; G06F 16/28; G06F 16/2379; G06F 16/24552
See application file for complete search history.

(56) References Cited

U.S. PATENT DOCUMENTS

| 5,511,197 A | 4/1996 | Hill |
|---|---|---|
| 5,682,537 A | 10/1997 | Davies |
| 6,272,491 B1 | 8/2001 | Chan |
| 7,376,744 B2 | 5/2008 | Loaiza |
| 7,426,653 B2 | 9/2008 | Hu |

(Continued)

OTHER PUBLICATIONS

IBM Knowledge Center DB2 Version 9.7 for Linux, UNIX, and Windows Reclaimable storage; https://www.ibm.com/support/knowledgecenter/en/SSEPGG_9.7.0/com.ibm.db2.luw.admin.dbobj.doc/doc/c0055392.html; retrieved from the internet Nov. 21, 2019; 6 pages.

(Continued)

*Primary Examiner* — Mark D Featherstone
*Assistant Examiner* — Kweku William Halm
(74) *Attorney, Agent, or Firm* — Schmeiser, Olsen & Watts; Stephanie Carusillo

(57) ABSTRACT

A method, system, and program product for updating buffer pools in a shared disk clustered database system is provided. The method includes generating thread software code for servers of a clustered database system. Cluster-wide lock software configured with respect to a shared mode for servers of the clustered database system is received. A tablespace space reclaim function is executed for moving data pages from a first location of a shared disk structure to a second location resulting in generation of updated data page metadata. The updated data page metadata is stored within the clustered database system and functionality of thread software code is detected. The cluster-wide lock software is reclaimed, enabling remote thread software code. A second cluster-wide lock is utilized to coordinate achievement of an idle state of local and remote threads. An idle state is enabled with respect to servers of the shared disk clustered database system.

20 Claims, 9 Drawing Sheets

(56) References Cited

U.S. PATENT DOCUMENTS

| | | |
|---|---|---|
| 7,484,048 B2 | 1/2009 | Whitehouse |
| 7,779,417 B2 | 8/2010 | Lari |
| 8,224,977 B2 | 7/2012 | Loaiza |
| 8,751,768 B2 | 6/2014 | Malige |
| 8,886,596 B2 | 11/2014 | Effern |
| 9,262,244 B2 | 2/2016 | Kumar |
| 9,454,549 B1 | 9/2016 | Bachu |
| 9,519,649 B2 | 12/2016 | Bonner |
| 9,767,131 B2 | 9/2017 | Zhang |
| 2004/0267787 A1 | 12/2004 | Huras |
| 2005/0071841 A1* | 3/2005 | Hoflehner ............... G06F 8/441 718/100 |
| 2006/0212573 A1 | 9/2006 | Loaiza |
| 2008/0065644 A1* | 3/2008 | Pasupuleti .......... G06F 16/2477 |
| 2010/0281471 A1* | 11/2010 | Liao ..................... G06F 9/3842 717/141 |
| 2011/0029975 A1 | 2/2011 | Zhang |
| 2012/0059963 A1* | 3/2012 | Pasupuleti .......... G06F 16/2343 710/200 |
| 2016/0283503 A1* | 9/2016 | Parikh ................. G06F 16/2282 |
| 2020/0241791 A1* | 7/2020 | Thomsen ............. G06F 3/0659 |

OTHER PUBLICATIONS

Mell, Peter et al.; "The NIST Definition of Cloud Computing;" National Institute of Standards and Technology; Special Publication 800-145; Sep. 2011; 7 pages.

\* cited by examiner

SHARED DISK BUFFER POOL UPDATE AND MODIFICATION

BACKGROUND

The present invention relates generally to a method for updating buffer pools in a shared disk clustered database system during tablespace space reclaim process and in particular to a method and associated system for improving software and memory technology associated with generating and updating specialized software and metadata and enabling a cluster-wide idle state.

SUMMARY

A first aspect of the invention provides a shared disk buffer pool updating method comprising: generating, by a processor of a hardware device, first thread software code for each server of a plurality of servers of a clustered database system, wherein the plurality of servers are connected to a shared disk structure; receiving, by the processor from a distributed lock manager apparatus, update lock software configured with respect to a shared mode of the plurality of servers; executing, by the processor in response to a command from a first server, a tablespace space reclaim function comprising moving data pages from a first location of the shared disk structure to a second location of the shared disk structure resulting in generation of updated data page metadata; storing within the clustered database system, by the processor, the updated data page metadata; detecting, by the processor, functionality of helper thread software code; enabling, by the processor in response to results of the detecting, an upgrade to an exclusive mode of the update lock software; enabling, by the processor, remote helper thread software code; disabling, by the processor, the updated data page metadata for preventing the data page metadata from being reused; and enabling, by the processor, an idle state with respect to the first server.

A second aspect of the invention provides a computer program product, comprising a computer readable hardware storage device storing a computer readable program code, the computer readable program code comprising an algorithm that when executed by a processor of a hardware device implements a shared disk buffer pool updating method, the method comprising: generating, by the processor, first thread software code for each server of a plurality of servers of a clustered database system, wherein the plurality of servers are connected to a shared disk structure; receiving, by the processor from a distributed lock manager apparatus, update lock software configured with respect to a shared mode of the plurality of servers; executing, by the processor in response to a command from a first server, a tablespace space reclaim function comprising moving data pages from a first location of the shared disk structure to a second location of the shared disk structure resulting in generation of updated data page metadata; storing within the clustered database system, by the processor, the updated data page metadata; detecting, by the processor, functionality of helper thread software code; enabling, by the processor in response to results of the detecting, an upgrade to an exclusive mode of the update lock software; enabling, by the processor, remote helper thread software code; disabling, by the processor, the updated data page metadata for preventing the data page metadata from being reused; and enabling, by the processor, an idle state with respect to the first server.

A third aspect of the invention provides a hardware device comprising a processor coupled to a computer-readable memory unit, the memory unit comprising instructions that when executed by the processor implements a shared disk buffer pool updating method comprising: generating, by the processor, first thread software code for each server of a plurality of servers of a clustered database system, wherein the plurality of servers are connected to a shared disk structure; receiving, by the processor from a distributed lock manager apparatus, update lock software configured with respect to a shared mode of the plurality of servers; executing, by the processor in response to a command from a first server, a tablespace space reclaim function comprising moving data pages from a first location of the shared disk structure to a second location of the shared disk structure resulting in generation of updated data page metadata; storing within the clustered database system, by the processor, the updated data page metadata; detecting, by the processor, functionality of helper thread software code; enabling, by the processor in response to results of the detecting, an upgrade to an exclusive mode of the update lock software; enabling, by the processor, remote helper thread software code; disabling, by the processor, the updated data page metadata for preventing the data page metadata from being reused; and enabling, by the processor, an idle state with respect to the first server.

The present invention advantageously provides a simple method and associated system capable of accurately updating buffer pools in a shared disk database cluster.

DETAILED DESCRIPTION

Figure 1:
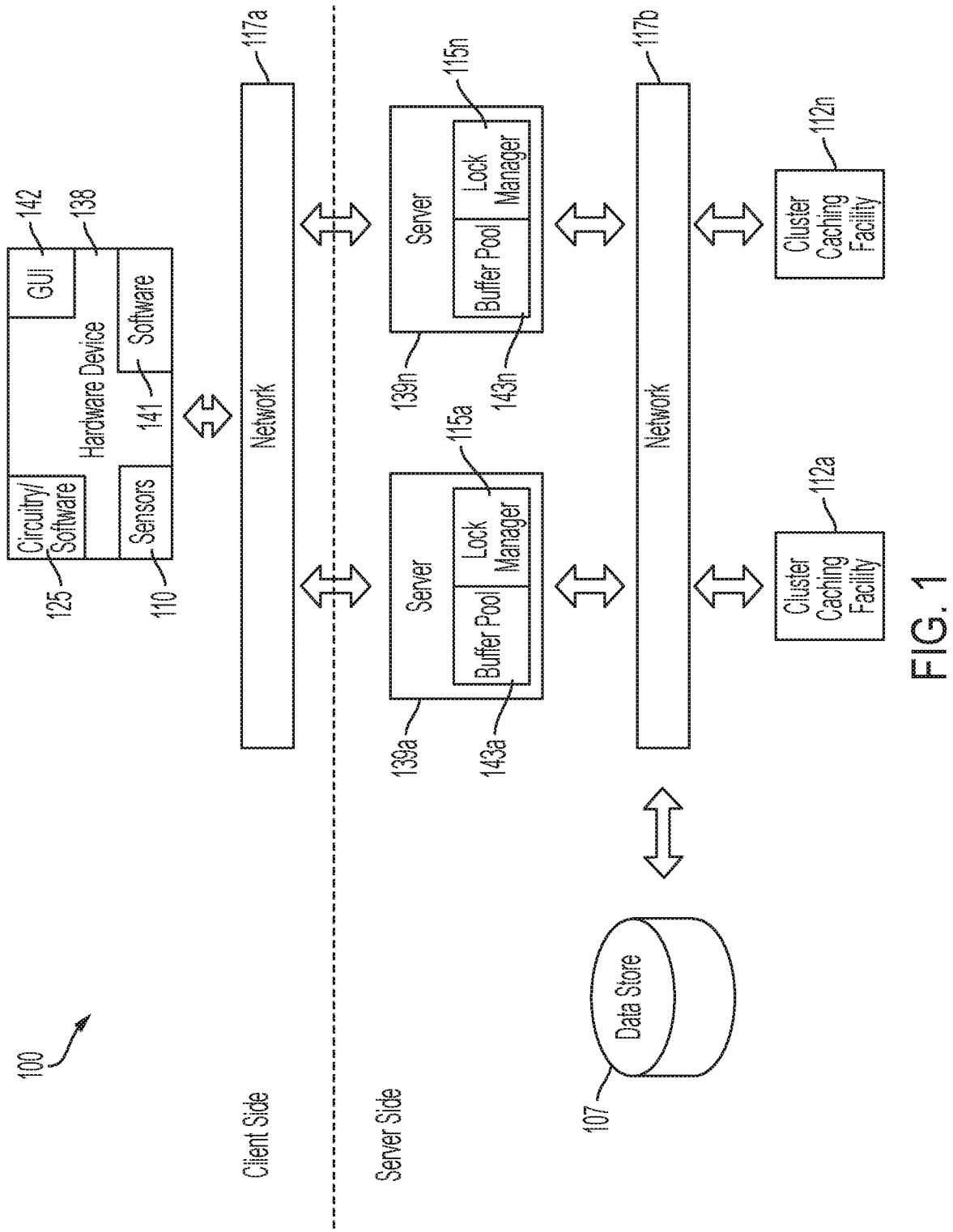
FIG. 1 illustrates a system for improving software and memory technology associated with generating and updating specialized software and metadata and enabling a server idle state, in accordance with embodiments of the present invention.

FIG. 1 illustrates a system 100 for improving software and memory technology associated with generating and updating specialized software and metadata and enabling a server idle state, in accordance with embodiments of the present invention. A typical shared disk database cluster may include database servers running with respect to interconnected computer hardware sharing a permanent storage system. Associated data may be organized within the permanent storage system in units referred to as pages. The pages are collected into larger units (i.e., extents) contained within tablespaces. Associated metadata may be stored within buffer pools in (volatile memory of) one or more of the database server memory units to enhance operational performance.

During normal operations being performed within a database, gaps within a tablespace may begin to form. For example, when objects such as rows or tables are dropped, extents and pages (within the extents) are released as they are no longer needed.

During a specified time period, a database administrator may initiate an operation to reclaim space occupied by the gaps within a tablespace by filling the gap with extents from an end of the tablespace and reclaiming the free space currently located at the end of the tablespace. Eliminating the gaps reduces a tablespace's overall size thereby maximizing usage of the permanent storage system with respect to additional tablespaces or additional entities stored in the shared storage (e.g., database logs). If a tablespace space reclaim operation is performed with respect to a database cluster during an operational mode (as opposed to a maintenance mode), buffer pools must be updated. Likewise, every buffer pool within a database cluster (i.e., comprising page metadata such as, inter alia, a page's old location) must be updated with the page's new metadata (e.g., a page's new location). Failure to update all page metadata within the cluster may cause a first server of the cluster to read from or write to the page's old location while a second server reads from or writes to the page's new location thereby leading to lost updates or other forms of data corruption.

Servers within a database cluster may be configured to operate independently with respect to differing operational loads. The servers may reside: within a same physical host, across a network of physical hosts, etc. The servers may be configured to operate within an operating system environment that may suspend server processes and threads without a prediction for execution. Additionally, a server may experience a failure at a critical time and require self-recovery processes.

Successful page movement processes require that every server within a database cluster may:
1. Update buffer pool page metadata.
2. Perform a metadata update.
3. Perform multiple buffer pool update operations.

A page movement process may be performed with respect to a decentralized manner across the database cluster such that page movement may be initiated from any of the cluster's servers while two or more tablespaces are executing a space reclaim process simultaneously.

System 100 enables a process such that:
1. If a server executing a page movement process experiences a critical failure, a page metadata update process must be completed or the page must be restored to its former location.
2. If a server drops out of a cluster, a metadata update process must be successful with respect to surviving servers such that page movement processes may successfully terminate.

Typical server systems are associated with protocols (i.e., locks) implemented in software that restrict access to a resource (e.g., a file, a portion of memory, etc.). Locks are used to ensure that a shared resource remains consistent. A lock may be created, acquired, released, or destroyed and be held by an entity, such as a software agent of a database server. Two or more entities may hold a lock in shared mode at the same time thereby allowing the entities to simultaneously read a shared resource. In order to alter a shared resource, an entity must acquire a lock in an exclusive mode. When a lock has been acquired in exclusive mode by an entity, an additional entity may not acquire the lock in a shared mode until the originating entity has released its exclusive hold on the lock. Locks may be managed by a distributed lock manager in a clustered database management system. The distributed lock manager may implement various aspects of a lock including, inter alia, ownership, lock states, lock state transitions, etc. A lock in a clustered database management system may be enabled across an entire cluster. Additionally, a lock in a clustered database management system may be enabled between threads of a same process (i.e., a latch). A distributed lock manager may be configured to implement a technique to notify an entity holding a lock that the lock requires reclaiming because another entity is requesting to acquire the lock.

A shared disk clustered database management system may be disabled (taken out of service) for maintenance and a space reclaim process may be executed during the maintenance period. Therefore system 100 enables a process for enabling a page movement process while a shared-disk clustered database management system is available to perform operations requested by client applications.

System 100 is configured to update page metadata in buffer pools of servers of a shared disk database cluster during page movement operations via usage of a number of locks, threads, and waitposts implemented in software. During a startup process, a server of a shared disk database cluster creates and initializes a thread dedicated to buffer pool metadata updates. A server may additionally create a thread for lock reclamation. Therefore, when a page movement process is initiated, a server in the cluster may task a thread to perform main page movement steps.

System 100 enables a distributed lock manager module for waking up (i.e., enabling) lock reclamation threads when an entity acquires a lock in a higher mode. The distributed lock manager module implements a fairness rule that grants higher mode requests ahead of trailing requests. Additionally, a central distributed location is used to store information critical to the page movement process.

System 100 of FIG. 1 includes servers 139a . . . 139n (i.e., specialized hardware device), a hardware device 138, cluster caching facilities 112a . . . 112n, and a data store 107 (e.g., a cloud-based system) interconnected through a network 117a and 117b. Network 117a is associated with a client side of system 100 and network 117b is associated with a server side of system 100. Hardware device 138 may include, inter alia, a smart phone, a tablet computer, a computing device, etc. Hardware device 138 may be Bluetooth enabled to provide connectivity to any type of system. Hardware device 138 includes specialized circuitry/software 125 (that may include specialized software), sensors 110, software 141, and a GUI 142. Sensors 110 may include any type of internal or external sensor (or biometric sensor) including, inter alia, ultrasonic three-dimensional sensor modules, an optical sensor, a video retrieval device, an audio retrieval device, humidity sensors, voltage sensors, a keyboard, a mouse, a touch screen, a temperature sensor, etc. Servers 139a . . . 139n include associated buffer pools 143a . . . 143n and lock managers 115a . . . 115n (e.g., implemented in software, hardware, etc). Servers 139a . . . 139n, cluster caching facilities 112a . . . 112n, and hardware device 138 may each comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, servers 139a . . . 139n, cluster caching facilities 112a . . . 112n, and hardware device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software and memory technology associated with generating and updating specialized software and metadata and enabling a server idle state. Network 117a and 117b may include any type of network including, inter alia, a 5G telecom network, a local area network, (LAN), a wide area network (WAN), the Internet, a wireless network, etc. Alternatively, network 117a and 117b may include an application programming interface (API).

System 100 enables a process for updating buffer pools within a shared disk clustered database management system as follows:

The process is initiated when each server (of a plurality of servers in a shared disk database cluster comprising a distributed lock manager) generates a helper thread (i.e., a sequence of instructions comprised by an operating system) to execute a buffer pool metadata update during a page movement process. Each helper thread running on a server for moving a page is designated as a local helper thread. Additional helper threads are designated as remote helper threads. The local helper thread and the remote helper thread acquire updateLock code enabled in a shared mode from the distributed lock manager. All helper threads are placed in an idle state with respect to blocking on a waitpost designated a helperWP. A notify thread registered with the distributed lock manager is created by each server during an initialization process and in response, a notify thread blocks a waitpost designated a notifyWP. A remote buffer pool metadata update sequence is enabled by acquiring an accessLock in an exclusive mode in response to a server performing a tablespace space reclaim function (including a main page movement using a mover thread software code for updating local buffer pools). Likewise, a request to acquire the accessLock is granted by the distributed lock manager when the accessLock is free and a readyLock is acquired in an exclusive mode by the mover thread software code. The exclusive hold is released by the mover thread software code immediately for subsequent use and data associated with the page being moved (including page metadata) is stored. The local helper thread is enabled by mover thread software code by posting the local helperWP. Additionally, a designated moverWP is blocked with a predetermined timeout to handle a possible hang of the local helper thread. In response, the local helper thread reviews the contents of the cluster caching facility.

If the helper thread software code is determined to reside on a same cluster server, the helper thread software code executes as a coordinator thereby causing the local helper thread to attempt to upgrade the updateLock to an exclusive mode from the distributed lock manager. In response to upgrading the updateLock to an exclusive mode, the distributed lock manager reclaims the lock by posting the notifyWP and the notify thread enables the remote helper thread by posting the helperWP.

If the helper thread software code is determined not to reside on the same cluster server, the helper thread software code executes as a subordinate thereby requesting to acquire the readyLock in a shared mode and the subordinate updates local buffer pools. Subsequently the updateLock is released by the subordinate and attempts to reacquire the updateLock in a shared mode are executed by the subordinate.

The coordinator's earlier request to upgrade the updateLock to exclusive mode will be granted ahead of a trailing request thereby notifying the coordinator that all subordinates have updated remote buffer pools. The coordinator downgrades its exclusive hold on the updateLock to a shared mode, enabling subordinates to acquire the updateLock in a shared mode. The subordinates subsequently release their respective shared holds on the readyLock. The mover thread software code is enabled and the readyLock is acquired in an exclusive mode by the mover thread software code. The mover thread software code releases the readyLock and invalidates the movement data (for the page being moved) in a cluster caching facility to avoid accidental reuse and a hold is released for the accessLock thereby enabling access by additional page movers.

In response to the coordinator enabling the mover thread software code by posting the moverWP, the system returns to a start of a buffer pool metadata update process (by the coordinator) and the coordinator holds the updateLock in a shared mode thereby enabling the coordinator to block on the respective helperWP.

In response to the subordinate releasing the readyLock, the subordinate loops back to the start of the buffer pool metadata update process so that the subordinate holds the updateLock in a shared mode thereby enabling the subordinate to block again with respect to the respective helperWP.

In response to the remote notify thread posting the respective helperWP, the system loops back to the start of the buffer pool metadata update process and the system subsequently loops back to resume an initial idle state and ready status by blocking on the respective helperWP.

Figure 2:
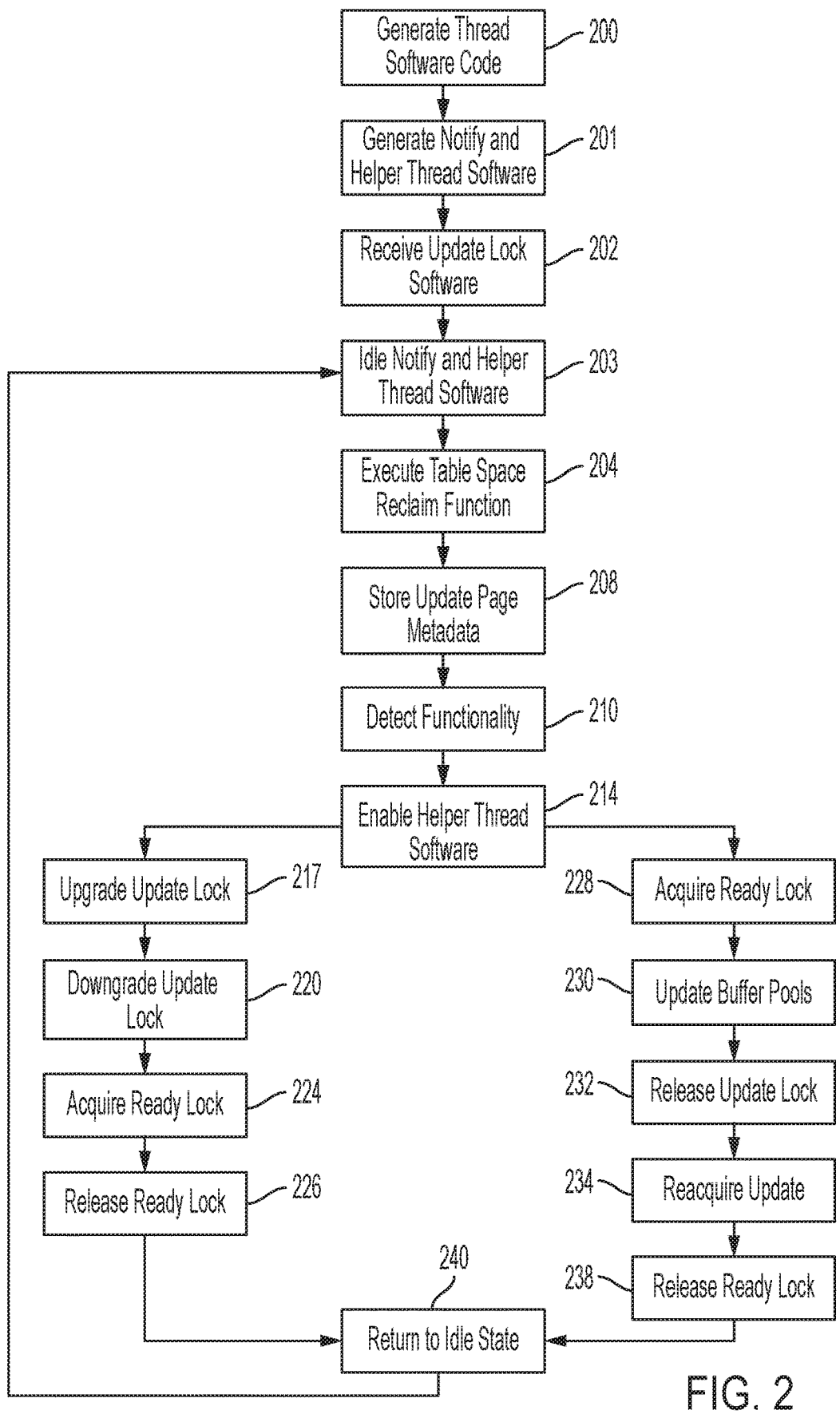
FIG. 2 illustrates an algorithm detailing a process flow enabled by the system of FIG. 1 for improving software and memory technology associated with generating and updating specialized software and metadata and enabling a server idle state, in accordance with embodiments of the present invention.

FIG. 2 illustrates an algorithm detailing a process flow enabled by system 100 of FIG. 1 for improving software and memory technology associated with generating and updating specialized software and metadata and enabling a server idle state, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by servers 139a . . . 139n, hardware device 138, cluster caching facility 112, and lock manager apparatus 115. In step 200, first thread software code is generated for each server of a plurality of servers of a clustered database system. The plurality of servers are connected to a shared disk structure. In step 201, notify and helper thread software is generated. In step 202, update lock software configured with respect to a shared mode of servers in the cluster is received. In step 203, notify and helper thread software are placed in an idle state, blocked from execution on their respective waitposts. In step 204, a tablespace space reclaim function is executed in response to a command from the first server. Executing the tablespace space reclaim function includes moving a data page from a first location of the shared disk structure to a second location of the shared disk structure resulting in generation of updated data page metadata. In step 208, the updated data page metadata is stored within the clustered database system. In step 210, functionality of helper thread software code is detected. Detecting functionality of the helper thread software code may include:
1. Determining that the helper thread software code is located on the first server.
2. Determining that the helper thread software code is not located on the first server.

In step 214, helper thread software code is enabled. Enabling functionality of the helper thread software code on the first server may include upgrading the update lock software from shared to an exclusive access mode in step 217 thereby leading to a process to reclaim the update lock software from the other servers, and subsequently resume execution of the notify and helper threads on the other servers. Once the exclusive access mode of the update lock software is acquired, the access mode is downgraded to a shared mode in step 220. In step 224, the ready lock is enabled with respect to an exclusive mode. Once acquired, the ready lock is released in step 226.

Alternatively, enabling functionality of the helper thread software code on servers not being the first server may include:
1. Receiving ready lock software configured with respect to a shared mode of the helper thread software code in step 228.
2. Updating an associated local buffer pool in step 230.
3. Disabling the update lock software from the shared mode in step 232.
4. Re-enabling the update lock software in a shared mode in step 234.
5. Disabling the ready lock software from the shared mode in step 238.

In step 240, the plurality of servers returns to an idle state.

Figure 3:
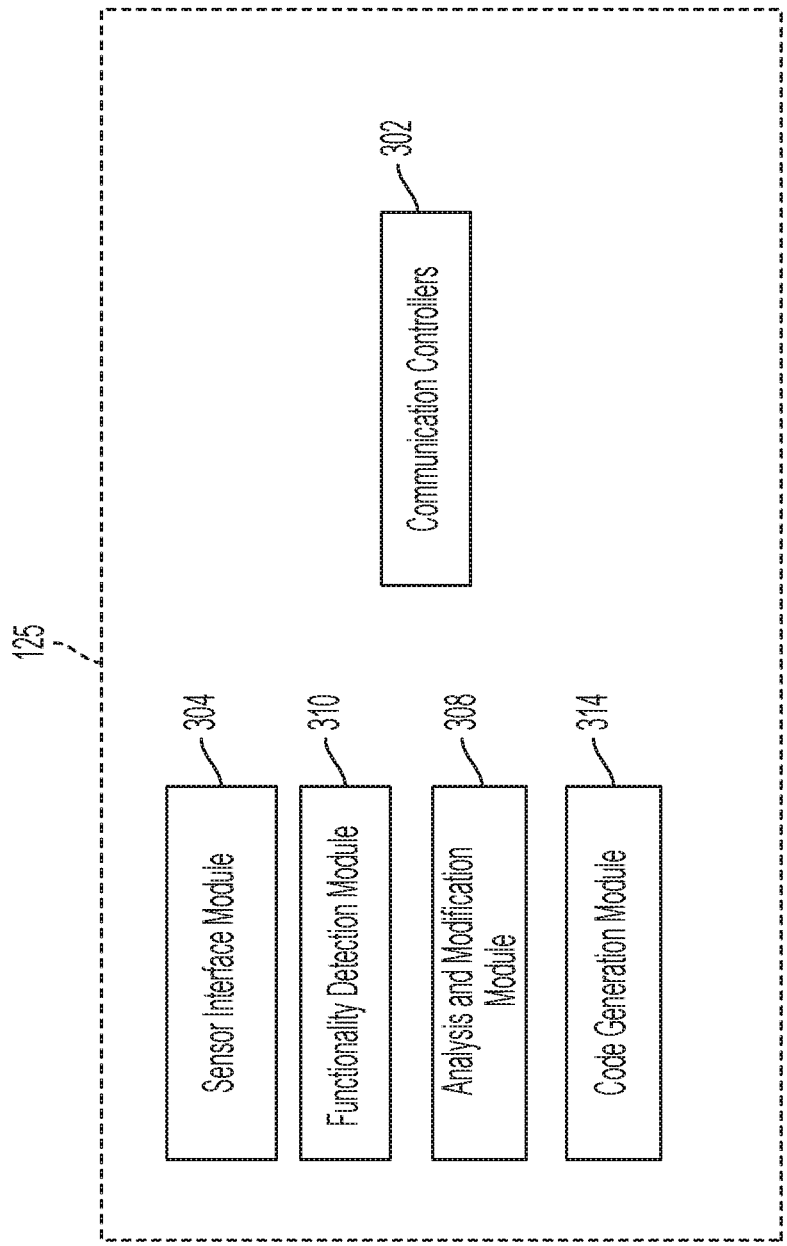
FIG. 3 illustrates an internal structural view of the circuitry/software of FIG. 1, in accordance with embodiments of the present invention.

FIG. 3 illustrates an internal structural view of circuitry/software 125 of FIG. 1, in accordance with embodiments of the present invention. Circuitry/software 125 includes a sensor interface module 304, functionality detection module 310, an analysis and modification module 308, a code generation module 314, and communication controllers 302. Sensor interface module 304 comprises specialized hardware and software for controlling all functions related to sensors 110 of FIG. 1. Functionality detection module 310 comprises specialized hardware and software for controlling all functionality related to control of all functionality detection processes for implementing the process described with respect to the algorithm of FIG. 2. Analysis and modification module 308 comprises specialized hardware and software for controlling all functions related to the analysis and modification steps of FIG. 2. Code generation module 314 comprises specialized hardware and software for controlling all functions related to generating machine learning software code for executing future interactive software selection and modification processes. Communication controllers 302 are enabled for controlling all communications between sensor interface module 304, audio conversion module 310, analysis and modification module 308, and code generation module 314.

Figure 4A:
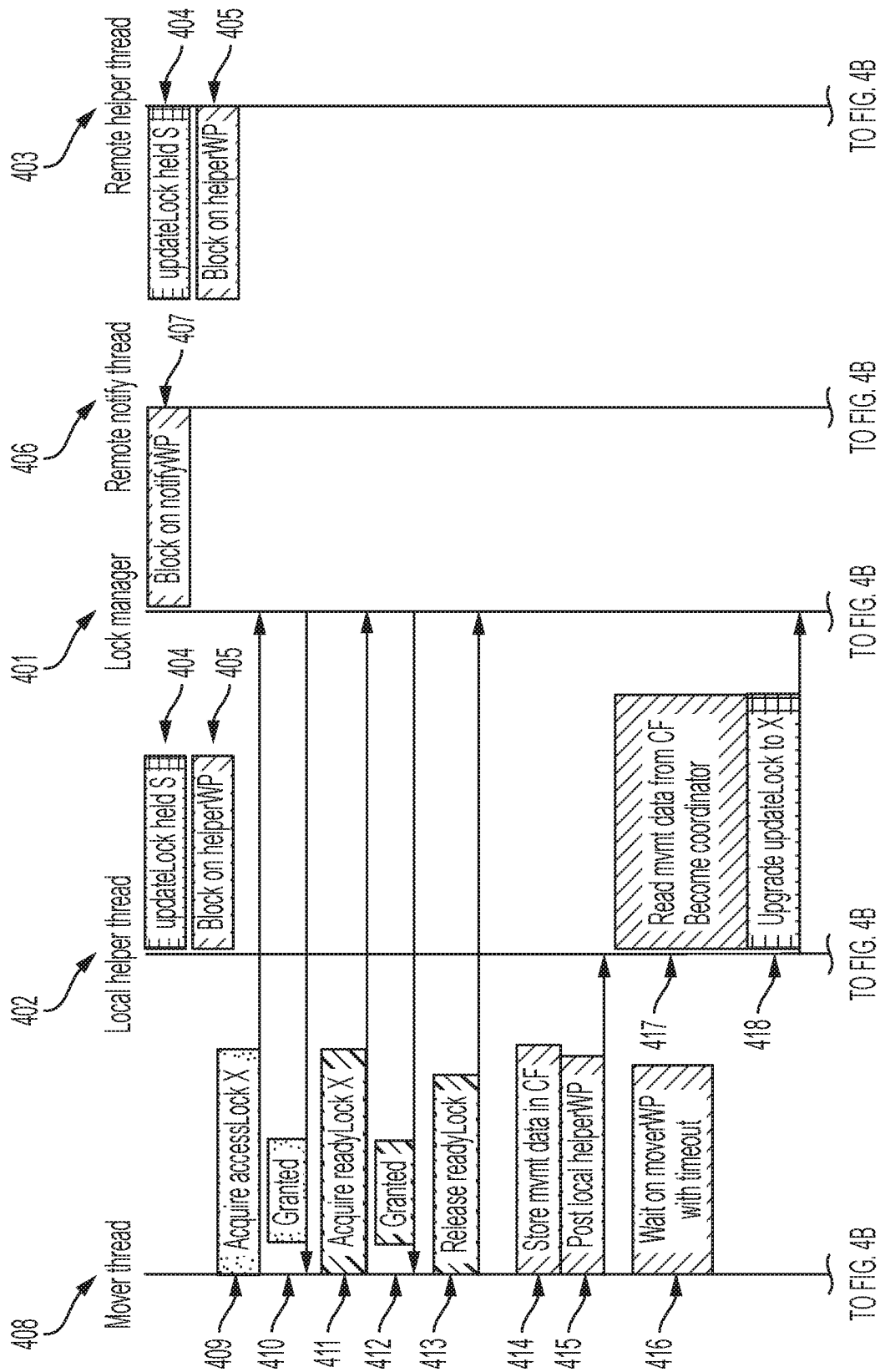
FIGS. 4A-4C illustrate a process for updating buffer pools, in accordance with embodiments of the present invention.
Figure 4B:
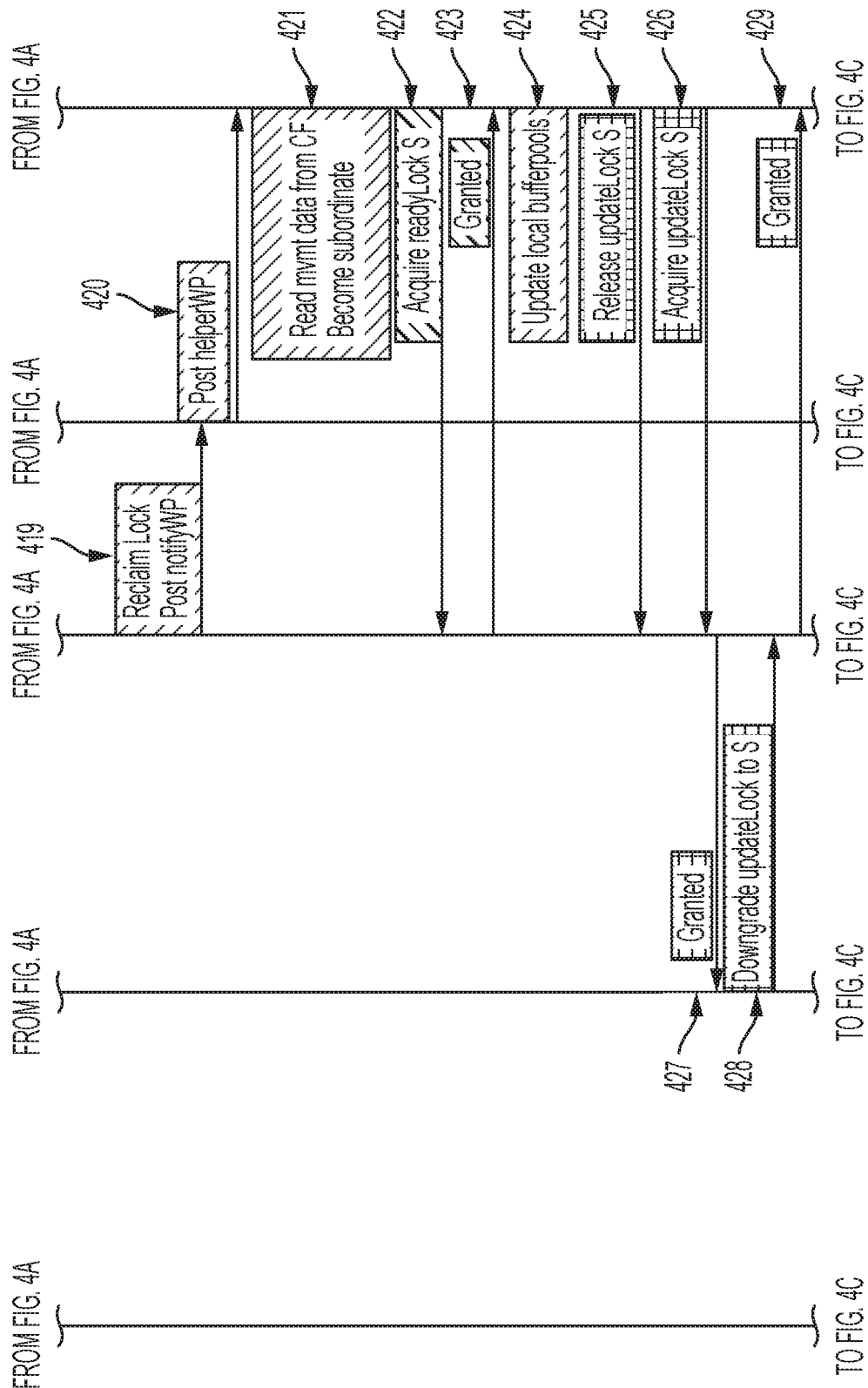
Figure 4C:
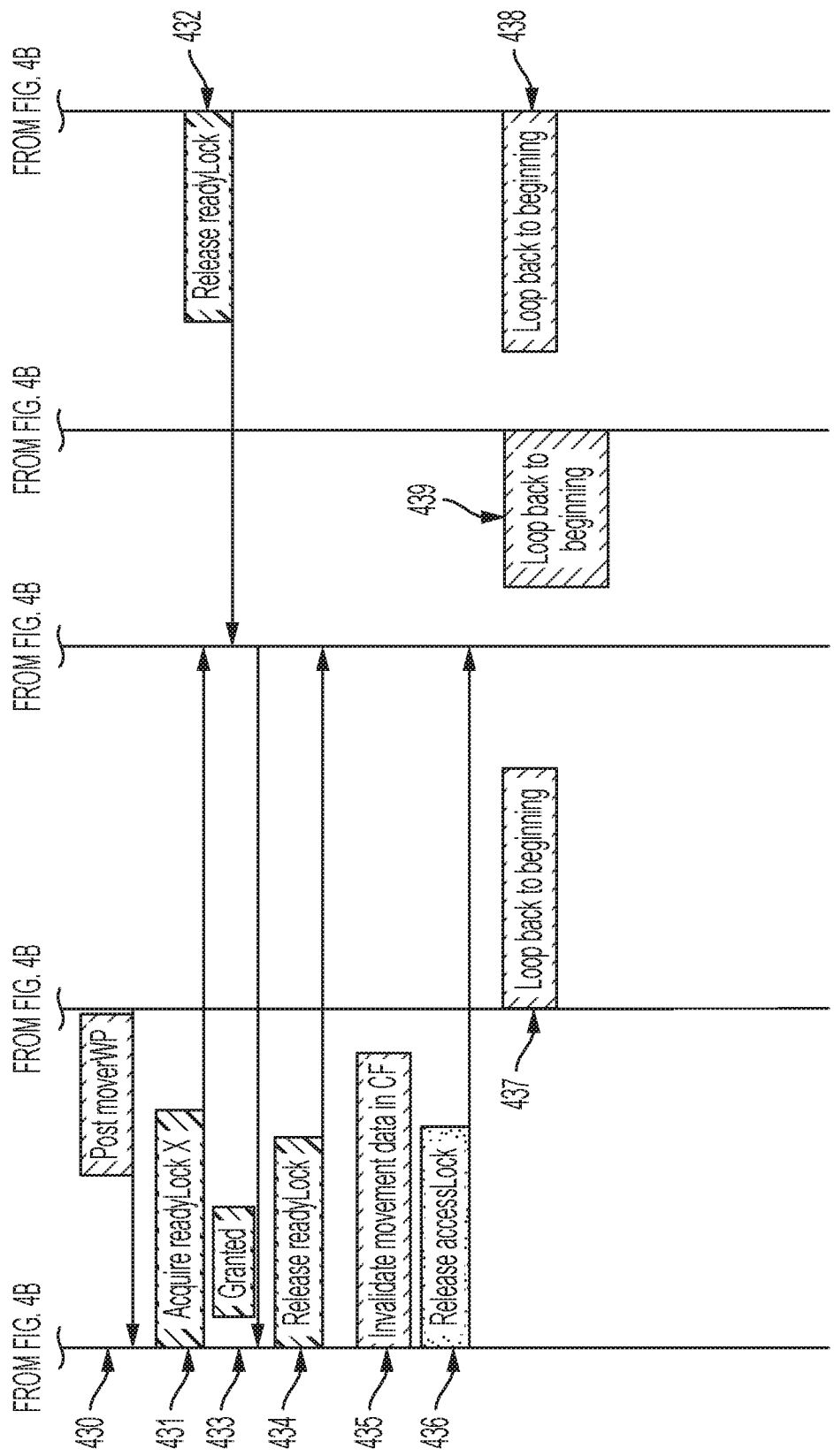

FIGS. 4A-4C illustrate a process 400 for updating buffer pools, in accordance with embodiments of the present invention. Process 400 includes functionality for updating buffer pools when a page is moved within a shared disk database cluster. In step 401, a distributed lock manager implemented in software enables each server in the shared disk database to create a remote notify thread to reclaim locks. In step 402, the helper thread (running on the server) is configured to become a coordinator or subordinate and to update bufferpools local to the helper thread. In step 403, additional helper threads (running on other servers) are designated a remote helper thread and are likewise configured to become a coordinator or a subordinate and to update bufferpools local to the respective helper thread. In step 404, the local and remote helper threads acquire an updateLock (software) from a distributed lock manager operating in a shared mode. In step 405, a number of helper waitposts block operation, enabling an idle state for the helper threads. In step 406, a distributed lock manager enables each server in a database cluster to create a notify thread that is registered with the distributed lock manager. Subsequently, the notify thread blocks on a different waitpost in step 407. In step 408, mover thread software performing tablespace space reclaim runs to execute main page movement software. In step 409, a remote buffer pool metadata update sequence is initiated by acquiring an accessLock in an exclusive or X mode and in step 410 a request is granted by the distributed lock manager when the lock is free. In step 411, the mover thread software code initializes and acquires readyLock code in an exclusive mode. If an exclusive hold request with respect to the readyLock code is granted in step 412, then in step 413, the mover thread software code releases it immediately for later use.

In step 414, the mover thread software code stores data associated with the page being moved (e.g., page metadata, pool id, etc.) within the cluster caching facility. In step 415, the mover thread software code enables the local helper thread by posting the local helperWP. In step 416, the mover thread software code blocks operation by waiting for the moverWP with a timeout in case the local helper thread malfunctions. During the enabling process, the local helper thread reads the cluster caching facility, and determines the mover thread software code is on the same cluster server. The local helper thread becomes coordinator in step 417 and as a coordinator, the local helper thread attempts to upgrade the updateLock to exclusive (or X) mode in step 418. In step 419, the distributed lock manager reclaims the updateLock by posting the notifyWP in one potential implementation. In response, the notify thread enables the remote helper thread by posting the helperWP in step 420. In step 421, the remote helper thread reads the cluster caching facility, determines that the mover thread software code is not located on a same cluster server, and becomes a subordinate. In step 422, the subordinate begins by acquiring the readyLock in a shared (or S) mode. When an associated request is granted by the distributed lock manager in step 423, then the subordinate updates local buffer pools in step 424. Subsequently, the subordinate releases updateLock software in step 425 and attempts to reacquire updateLock software in a shared mode in step 426. In step 427, the distributed lock manager ensures that the coordinator's earlier request to upgrade the updateLock to exclusive mode is granted ahead of a trailing request 426. The coordinator downgrades its hold on the updateLock to shared (or S) mode in step 428 thereby allowing subordinates to acquire the updateLock in a shared mode in step 429. In step 430, the coordinator posts the moverWP, waking up the mover thread software code. The mover thread software code attempts to acquire the readyLock in an exclusive (or X) mode in step 431. When all holds on the readyLock have been released in step 432, the distributed lock manager grants the exclusive request in step 433. Subsequently, the mover thread software code invalidates the data for this page movement in the cluster caching facility to avoid accidental reuse in step 435 thereby enabling the mover thread to release its exclusive hold on the accessLock for allowing additional page mover access.

When the coordinator has been enabled, the local helper thread software code posts the moverWP in step 430 and the process loops back to step 437 thereby blocking on the helperWP.

When the subordinate has released the readyLock in step 432, the process loops back to step 438, continuing to hold the updateLock in shared mode so it may block on the helperWP. Additionally, the remote notify thread will loop back to step 439 after posing the helperWP at step 420. The coordinator is no longer required to act as a coordinator and therefore it loops back around to resume its initial idle and ready status by blocking on the helperWP in step 437.

Figure 5:
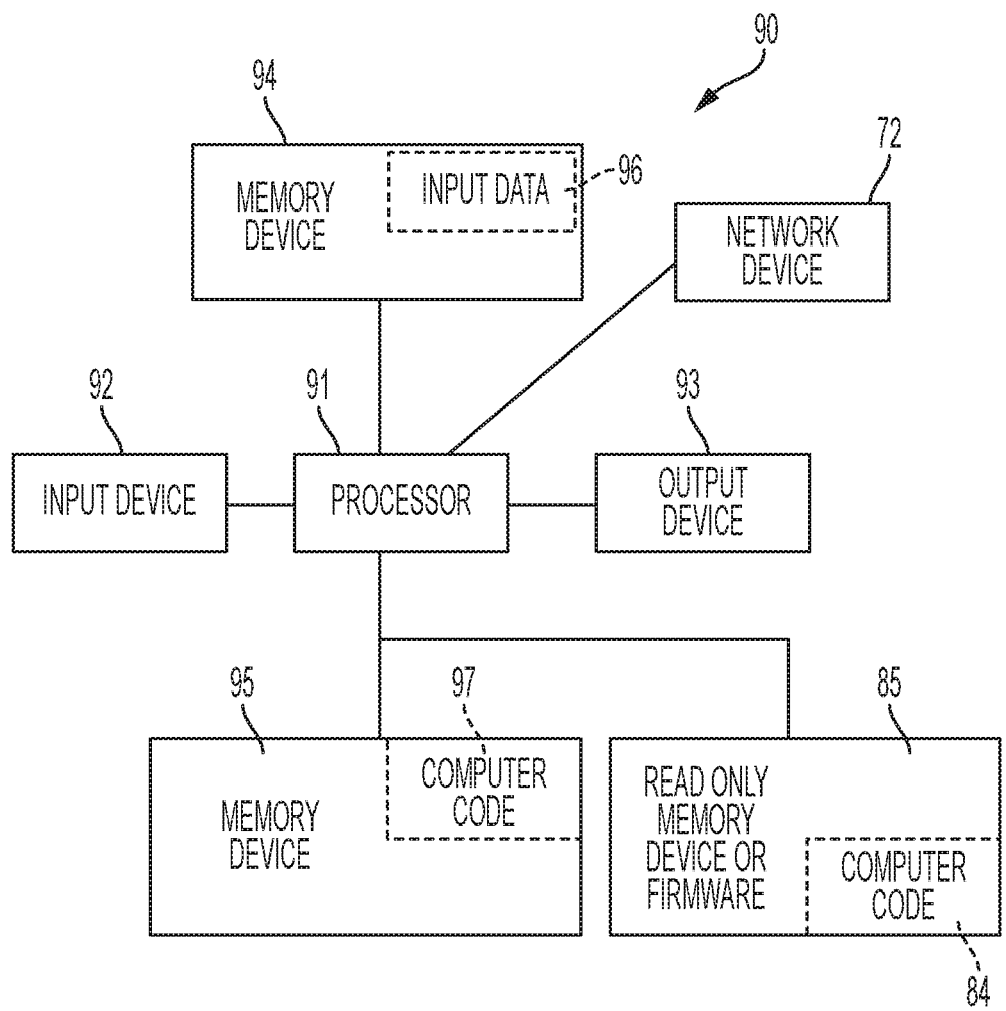
FIG. 5 illustrates a computer system used by the system of FIG. 1 for improving software and memory technology associated with generating and updating specialized software and metadata and enabling a server idle state, in accordance with embodiments of the present invention.

FIG. 5 illustrates a computer system 90 (e.g., servers 139*a* . . . 139*n*, hardware device 138, cluster caching facility pool 112, and/or lock manager apparatus 115 of FIG. 1) used by or comprised by the system of FIG. 1 for improving software and memory technology associated with generating and updating specialized software and metadata and enabling a server idle state, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, a network device 72 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software and memory technology associated with generating and updating specialized software and metadata and enabling a server idle state. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device). The networking device 72 is a device designed to communicate with other computer systems over networks commonly known as local area networks, wide area networks, campus area networks, and metropolitan area networks, using physical links such as, inter alia, wired, optical, or wireless, using data link protocols such as TCP/IP, UDP, ATM, Frame Relay, etc.

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and memory technology associated with generating and updating specialized software and metadata and enabling a server idle state. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and memory technology associated with generating and updating specialized software and metadata and enabling a server idle state. In another embodiment, the invention provides a business method that performs the process steps of the invention on a subscription, advertising, and/or fee basis. That is, a service supplier, such as a Solution Integrator, could offer to enable a process for improving software and memory technology associated with generating and updating specialized software and metadata and enabling a server idle state. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
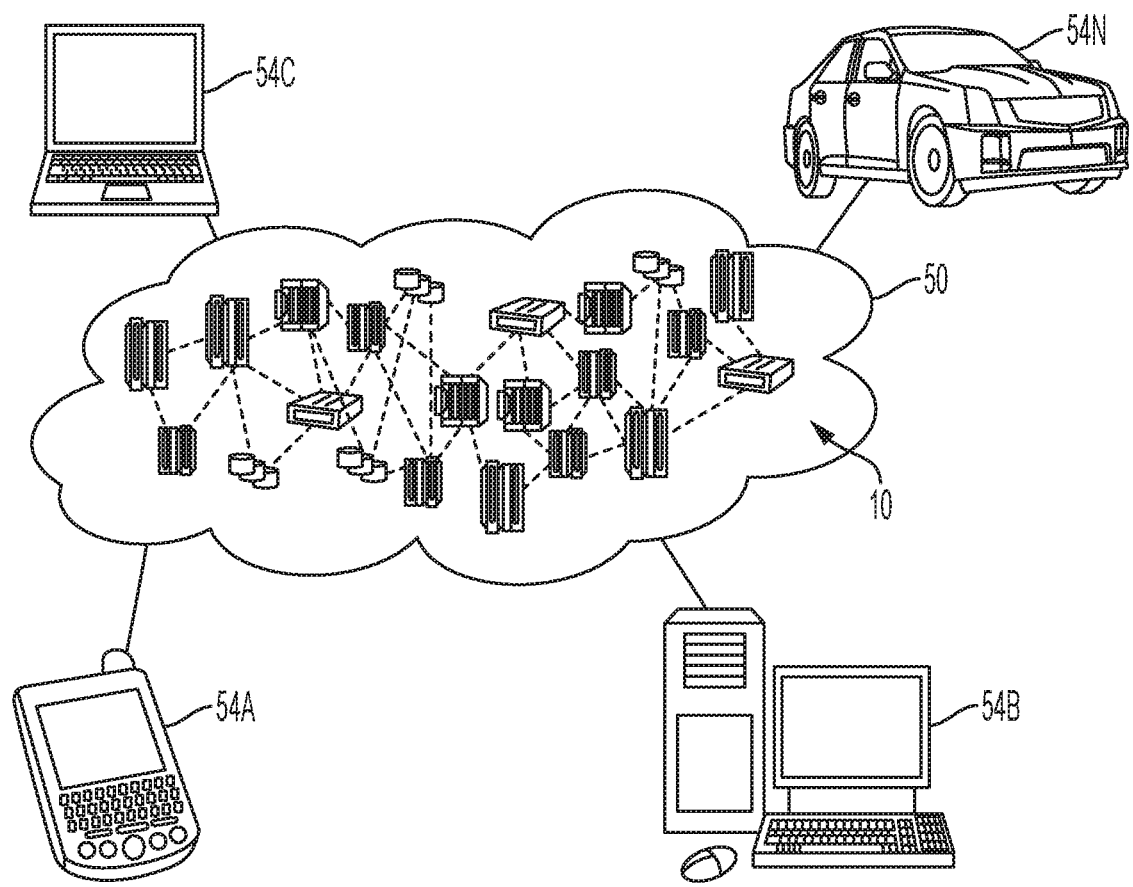
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
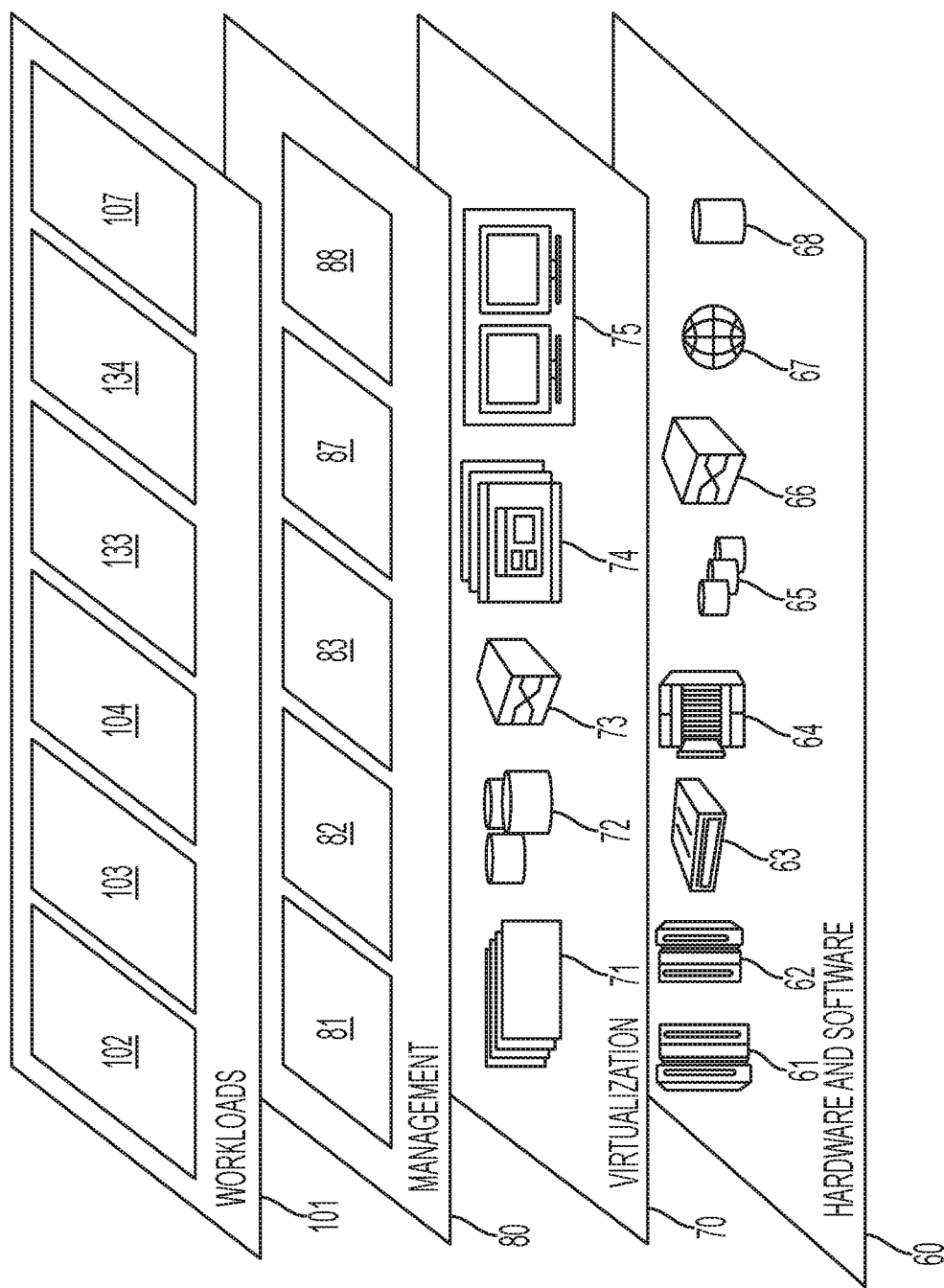
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software and memory technology associated with generating and updating specialized software and metadata and enabling a server idle state 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A shared disk buffer pool updating method comprising:
generating, by a processor of a hardware device, first thread software code for each server of a plurality of servers of a clustered database system, wherein said plurality of servers are connected to a shared disk structure;
receiving, by said processor from a distributed lock manager apparatus, update lock software configured with respect to a shared mode of said plurality of servers;
executing, by said processor in response to a command from a first server, a tablespace space reclaim function comprising moving data pages from a first location of said shared disk structure to a second location of said shared disk structure resulting in generation of updated data page metadata;
first enabling, by said processor in response to said executing, a remote buffer pool metadata update sequence via acquisition of an access lock of said update lock software;
initializing, by said processor in response to said first enabling, mover thread software code;
second enabling, by said processor in response to said initializing, said access lock with respect to an exclusive mode of the update lock software;
storing within said clustered database system in response to said second enabling, by said processor, said updated data page metadata;
detecting, by said processor, functionality of helper thread software code;
enabling, by said processor in response to results of the detecting, an upgrade to said exclusive mode of the update lock software;
determining, by said processor in response to said enabling, that all subordinate software code of said first thread software code comprises updated remote buffer pools;
blocking, by said processor, said mover thread software code with a predetermined timeout;
enabling, by said processor in response to said blocking, remote helper thread software code;
invalidating within a cluster caching facility, by said processor, movement data associated with said moving said data pages;
disabling in response to said invalidating, by said processor, said updated data page metadata for preventing said data page metadata from being reused;
enabling, by said processor, an idle state with respect to said first server;
detecting, by said processor, a critical failure of said moving said data pages from said first location to said second location; and
restoring, by said processor in response to results of said detecting, said data pages to said first location.

2. The method of claim 1, further comprising:
detecting, by said processor, data associated with said clustered database system, wherein said detecting said functionality of said helper thread software code is executed based on said data.

3. The method of claim 1, wherein said detecting said functionality of said helper thread software code comprises:
determining that said helper thread software code is located on said first server;
upgrading said update lock software to an exclusive access mode; and
reclaiming a lockout function with respect to said plurality of servers.

4. The method of claim 1, wherein said detecting said functionality of said helper thread software code comprises:
determining that said helper thread software code is not located on said first server;
receiving, by said helper thread software code from said distributed lock manager apparatus, ready lock software configured with respect to a shared mode of said helper thread software code;
updating, by said helper thread software code, an associated local buffer pool, wherein said helper thread software code is not located on said first server;
disabling said update lock software from said shared mode; and
enabling said update lock software in a shared mode.

5. The method of claim 4, further comprising:
downgrading, by said processor on said first server, an exclusive hold on the update lock software to shared mode; and
enabling, by said processor on said first server, said ready lock software in exclusive mode.

6. The method of claim 4, further comprising:
disabling, by said helper thread software code, said ready lock, wherein said helper thread software code is not located on said first server; and
disabling, by said processor executing mover thread software code, said ready lock, wherein said mover thread software code is located on said first server.

7. The method of claim 1, further comprising:
creating, by said processor, during initialization of said plurality of servers, notify thread software registered with said distributed lock manager apparatus; and
blocking, by said processor in response to said creating, said notify thread software from differing wait posts.

8. The method of claim 1, further comprising:
providing at least one support service for at least one of creating, integrating, hosting, maintaining, and deploying computer-readable code in the hardware device, said code being executed by the computer processor to implement: said generating, said receiving, said executing, said storing, said detecting, said enabling said update, said enabling said helper thread software code, said disabling, and said enabling said idle state.

9. A computer program product, comprising a computer readable hardware storage device storing a computer readable program code, said computer readable program code comprising an algorithm that when executed by a processor of a hardware device implements a shared disk buffer pool updating method, said method comprising:

generating, by said processor, first thread software code for each server of a plurality of servers of a clustered database system, wherein said plurality of servers are connected to a shared disk structure;

receiving, by said processor from a distributed lock manager apparatus, update lock software configured with respect to a shared mode of said plurality of servers;

executing, by said processor in response to a command from a first server, a tablespace space reclaim function comprising moving data pages from a first location of said shared disk structure to a second location of said shared disk structure resulting in generation of updated data page metadata;

first enabling, by said processor in response to said executing, a remote buffer pool metadata update sequence via acquisition of an access lock of said update lock software;

initializing, by said processor in response to said first enabling, mover thread software code;

second enabling, by said processor in response to said initializing, said access lock with respect to an exclusive mode of the update lock software;

storing within said clustered database system in response to said second enabling, by said processor, said updated data page metadata;

detecting, by said processor, functionality of helper thread software code;

enabling, by said processor in response to results of the detecting, an upgrade to said exclusive mode of the update lock software;

determining, by said processor in response to said enabling, that all subordinate software code of said first thread software code comprises updated remote buffer pools;

blocking, by said processor, said mover thread software code with a predetermined timeout;

enabling, by said processor in response to said blocking, remote helper thread software code;

invalidating within a cluster caching facility, by said processor, movement data associated with said moving said data pages;

disabling in response to said invalidating, by said processor, said updated data page metadata for preventing said data page metadata from being reused;

enabling, by said processor, an idle state with respect to said first server;

detecting, by said processor, a critical failure of said moving said data pages from said first location to said second location; and restoring, by said processor in response to results of said detecting, said data pages to said first location.

10. The computer program product of claim 9, wherein said method further comprises:

detecting, by said processor, data associated with said clustered database system, wherein said detecting said functionality of said helper thread software code is executed based on said data.

11. The computer program product of claim 9, wherein said detecting said functionality of said helper thread software code comprises:

determining that said helper thread software code is located on said first server;

upgrading said update lock software to an exclusive access mode; and reclaiming a lockout function with respect to said plurality of servers.

12. The computer program product of claim 9, wherein said detecting said functionality of said helper thread software code comprises:

determining that said helper thread software code is not located on said first server;

receiving, by said helper thread software code from said distributed lock manager apparatus, ready lock software configured with respect to a shared mode of said helper thread software code;

updating, by said helper thread software code, an associated local buffer pool, wherein said helper thread software code is not located on said first server;

disabling said update lock software from said shared mode; and enabling said update lock software in a shared mode.

13. The computer program product of claim 12, wherein said method further comprises:

downgrading, by said processor on said first server, an exclusive hold on the update lock software to shared mode; and enabling, by said processor on said first server, said ready lock software in exclusive mode.

14. The computer program product of claim 12, wherein said method further comprises:

disabling, by said helper thread software code, said ready lock, wherein said helper thread software code is not located on said first server; and disabling, by said processor executing mover thread software code, said ready lock, wherein said mover thread software code is located on said first server.

15. The computer program product of claim 9, wherein said method further comprises:

creating, by said processor, during initialization of said plurality of servers, notify thread software registered with said distributed lock manager apparatus; and blocking, by said processor in response to said creating, said notify thread software from differing wait posts.

16. A hardware device comprising a processor coupled to a computer-readable memory unit, said memory unit comprising instructions that when executed by the processor implements a shared disk buffer pool updating method comprising:

generating, by said processor, first thread software code for each server of a plurality of servers of a clustered database system, wherein said plurality of servers are connected to a shared disk structure;

receiving, by said processor from a distributed lock manager apparatus, update lock software configured with respect to a shared mode of said plurality of servers;

executing, by said processor in response to a command from a first server, a tablespace space reclaim function comprising moving data pages from a first location of said shared disk structure to a second location of said shared disk structure resulting in generation of updated data page metadata;

first enabling, by said processor in response to said executing, a remote buffer pool metadata update sequence via acquisition of an access lock of said update lock software;

initializing, by said processor in response to said first enabling, mover thread software code;

second enabling, by said processor in response to said initializing, said access lock with respect to an exclusive mode of the update lock software;
storing within said clustered database system in response to said second enabling, by said processor, said updated data page metadata;
detecting, by said processor, functionality of helper thread software code;
enabling, by said processor in response to results of the detecting, an upgrade to said exclusive mode of the update lock software;
determining, by said processor in response to said enabling, that all subordinate software code of said first thread software code comprises updated remote buffer pools;
blocking, by said processor, said mover thread software code with a predetermined timeout;
enabling, by said processor in response to said blocking, remote helper thread software code;
invalidating within a cluster caching facility, by said processor, movement data associated with said moving said data pages;
disabling in response to said invalidating, by said processor, said updated data page metadata for preventing said data page metadata from being reused;
enabling, by said processor, an idle state with respect to said first server;
detecting, by said processor, a critical failure of said moving said data pages from said first location to said second location; and
restoring, by said processor in response to results of said detecting, said data pages to said first location.

17. The hardware device of claim 16, wherein said method further comprises:
detecting, by said processor, data associated with said clustered database system, wherein said detecting said functionality of said helper thread software code is executed based on said data.

18. The hardware device of claim 16, wherein said detecting said functionality of said helper thread software code comprises:
determining that said helper thread software code is located on said first server;
upgrading said update lock software to an exclusive access mode; and
reclaiming a lockout function with respect to said plurality of servers.

19. The hardware device of claim 16, wherein said detecting said functionality of said helper thread software code comprises:
determining that mover thread software code is not located on said first server;
receiving, by said helper thread software code from said distributed lock manager apparatus, ready lock software configured with respect to a shared mode of said mover thread software code;
updating, by said helper thread software code, an associated local buffer pool, wherein said helper thread software code is not located on said first server;
disabling said update lock software from said shared mode; and
enabling said update lock software in a shared mode.

20. The hardware device of claim 19, wherein said method further comprises:
downgrading, by said processor on said first server, an exclusive hold on the update lock software to shared mode; and
enabling, by said processor on said first server, said ready lock software in exclusive mode.

* * * * *